(12) United States Patent
Saito

(10) Patent No.: US 11,457,112 B2
(45) Date of Patent: Sep. 27, 2022

(54) INFORMATION PROCESSING TERMINAL, INFORMATION PROCESSING METHOD, AND NON-TRANSITORY COMPUTER-READABLE RECORDING MEDIUM TO DISPLAY PRINTER SCREEN

(71) Applicant: SATO HOLDINGS KABUSHIKI KAISHA, Tokyo (JP)

(72) Inventor: Koichi Saito, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/979,243

(22) PCT Filed: Sep. 5, 2019

(86) PCT No.: PCT/JP2019/034926
§ 371 (c)(1),
(2) Date: Sep. 9, 2020

(87) PCT Pub. No.: WO2020/054565
PCT Pub. Date: Mar. 19, 2020

(65) Prior Publication Data
US 2020/0404108 A1 Dec. 24, 2020

(30) Foreign Application Priority Data
Sep. 11, 2018 (JP) .............................. JP2018-169724

(51) Int. Cl.
*H04N 1/00* (2006.01)
*G06F 3/12* (2006.01)
(52) U.S. Cl.
CPC ......... *H04N 1/0001* (2013.01); *G06F 3/1203* (2013.01); *G06F 3/1236* (2013.01); *G06F 3/1287* (2013.01); *H04N 2201/0039* (2013.01)

(58) Field of Classification Search
None
See application file for complete search history.

(56) References Cited

U.S. PATENT DOCUMENTS 5,699,494 A * 12/1997 Colbert ................. G06F 3/1253
358/1.14
8,237,946 B2 * 8/2012 Lovat .................. H04N 1/00244
358/1.14
(Continued)

FOREIGN PATENT DOCUMENTS

EP        2 922 270 A2    9/2015
JP        2006-140898 A    6/2006
(Continued)

OTHER PUBLICATIONS

Extended European Search Report, Application No. 19859806.2, dated Oct. 4, 2021, 9 pages.

*Primary Examiner* — Henok Shiferaw
(74) *Attorney, Agent, or Firm* — Foley & Lardner LLP

(57) ABSTRACT

An information processing terminal capable of communicating with a server, the information processing terminal including: a request unit configured to request a server to acquire first information that have been displayed on a display screen of a printer capable of communicating with the server; an acquisition unit configured to acquire the first information from the server based on a request from the request unit; and a display control unit configured to control a display unit to display the first information acquired by the acquisition unit.

14 Claims, 15 Drawing Sheets

(56) References Cited

U.S. PATENT DOCUMENTS

| | | | |
|---|---|---|---|
| 10,455,100 B1* | 10/2019 | Fukushima | H04N 1/00188 |
| 10,469,674 B1* | 11/2019 | Fukushima | H04N 1/00411 |
| 10,897,553 B2* | 1/2021 | Kikuchi | G06F 3/1236 |
| 2006/0077454 A1* | 4/2006 | Lum | G06F 21/41 |
| | | | 358/1.15 |
| 2006/0120616 A1 | 6/2006 | Kita | |
| 2009/0080023 A1 | 3/2009 | Watabe | |
| 2012/0154852 A1* | 6/2012 | Hedberg | G06F 3/1208 |
| | | | 358/1.15 |
| 2012/0293823 A1* | 11/2012 | Gribel | G06F 3/1285 |
| | | | 358/1.13 |
| 2013/0021634 A1* | 1/2013 | Imaizumi | G06T 11/00 |
| | | | 358/1.13 |
| 2013/0148154 A1* | 6/2013 | Ito | G06F 3/1287 |
| | | | 358/1.15 |
| 2014/0279570 A1* | 9/2014 | Yoshida | G06Q 10/20 |
| | | | 705/305 |
| 2015/0026585 A1* | 1/2015 | Yoshida | H04L 67/025 |
| | | | 715/740 |
| 2015/0036178 A1* | 2/2015 | Nakamura | H04L 67/02 |
| | | | 358/1.15 |
| 2017/0366701 A1 | 12/2017 | Ooba | |
| 2017/0374211 A1* | 12/2017 | Saito | G06F 3/1286 |
| 2018/0191917 A1* | 7/2018 | Kawamura | H04N 1/00129 |
| 2018/0332137 A1* | 11/2018 | Tachi | H04L 67/2823 |
| 2019/0220232 A1* | 7/2019 | Nagai | G06F 3/1261 |
| 2019/0342464 A1* | 11/2019 | Kawamura | H04N 1/00039 |
| 2019/0364168 A1* | 11/2019 | Nishikai | G06F 3/121 |

FOREIGN PATENT DOCUMENTS

| | | | | |
|---|---|---|---|---|
| JP | 2006140898 A | * | 6/2006 | ......... H04N 1/00204 |
| JP | 2010-124357 A | | 6/2010 | |
| JP | 2015-179890 A | | 10/2015 | |
| JP | 2017-227989 A | | 12/2017 | |

* cited by examiner

| Equipment name | Connection type | Model name | Status | Installation location |
|---|---|---|---|---|
| A001 | Network connecting device | MODEL-A | ERROR | Sales floor2A |
| A003 | Network connecting device | MODEL-C | POWERSAVE | Sales floor3C |
| B010 | Network connecting device | MODEL-E | POWERSAVE | Sales floor1E |
| B001 | Network connecting device | MODEL-C | DISCONNECT | Office1A |
| A008 | Network connecting device | MODEL-B | ONLINE | Sales floor2B |
| B024 | Network connecting device | MODEL-A | POWERSAVE | Sales floor3E |
| C003 | Network connecting device | MODEL-D | DISCONNECT | Office1B |
| A040 | Network connecting device | MODEL-A | DISCONNECT | Sales floor2E |

FIG.5

INFORMATION PROCESSING TERMINAL, INFORMATION PROCESSING METHOD, AND NON-TRANSITORY COMPUTER-READABLE RECORDING MEDIUM TO DISPLAY PRINTER SCREEN

TECHNICAL FIELD

A present disclosure relates to an information processing terminal, an information processing method, and a program.

BACKGROUND ART

Conventionally, a printer connected to a network such as a local area network (LAN) is known (see Japanese Laid-open patent publication 2010-124357 for example).

SUMMARY OF THE INVENTION

Problems to be Solved by the Invention

Incidentally, there is a demand to share a screen of a printer connected to a LAN with an external terminal that is present outside of the LAN. For example, it would be convenient if one can confirm a status of a printer at a location remote from the printer, or one can instruct a specific operation method of the printer, in a situation in which an error occurs in the printer or other person does not understand the operation method of the printer.

However, in order for an external terminal, which is connected to a network outside of a LAN, to acquire an image that is being displayed on a printer connected to the LAN through HTTP/HTTPS communication, the information processing terminal needs to know a private address of the printer from which the image is acquired. Further, since a firewall is conventionally provided to the LAN to which the printer is connected, the external terminal is not able to access the printer, and thus not able to acquire the image that is being displayed on the printer.

Accordingly, the present disclosure aims to allow an information processing terminal that is provided outside of a network to display a screen of a printer connected to the network.

Means for Solving the Problems

An embodiment according to the present disclosure is an information processing terminal capable of communicating with a server, the information processing terminal including: a request unit configured to request a server to acquire first information that have been displayed on a display screen of a printer capable of communicating with the server; an acquisition unit configured to acquire the first information from the server based on a request from the request unit; and a display control unit configured to control a display unit to display the first information acquired by the acquisition unit.

Effects of the Invention

According to a present disclosure, an information processing terminal that is provided outside of a network is allowed to display a screen of a printer connected to the network.

BRIEF DESCRIPTION OF THE DRAWINGS

FIG. 5 shows an example of a screen displayed on the information processing terminal according to the first embodiment.

DETAILED DESCRIPTION OF THE INVENTION

The present invention relates to a Japanese patent application No. 2018-169724 filed on Sep. 11, 2018 with the Japan Patent Office, entire content of which is incorporated into this specification by reference.

Hereinafter, an embodiment of an information processing system and an information processing method according to the present invention will be explained in detail with reference to the drawings.

(1) First Embodiment

(1-1) Overview of an Information Processing System 1

Figure 1:
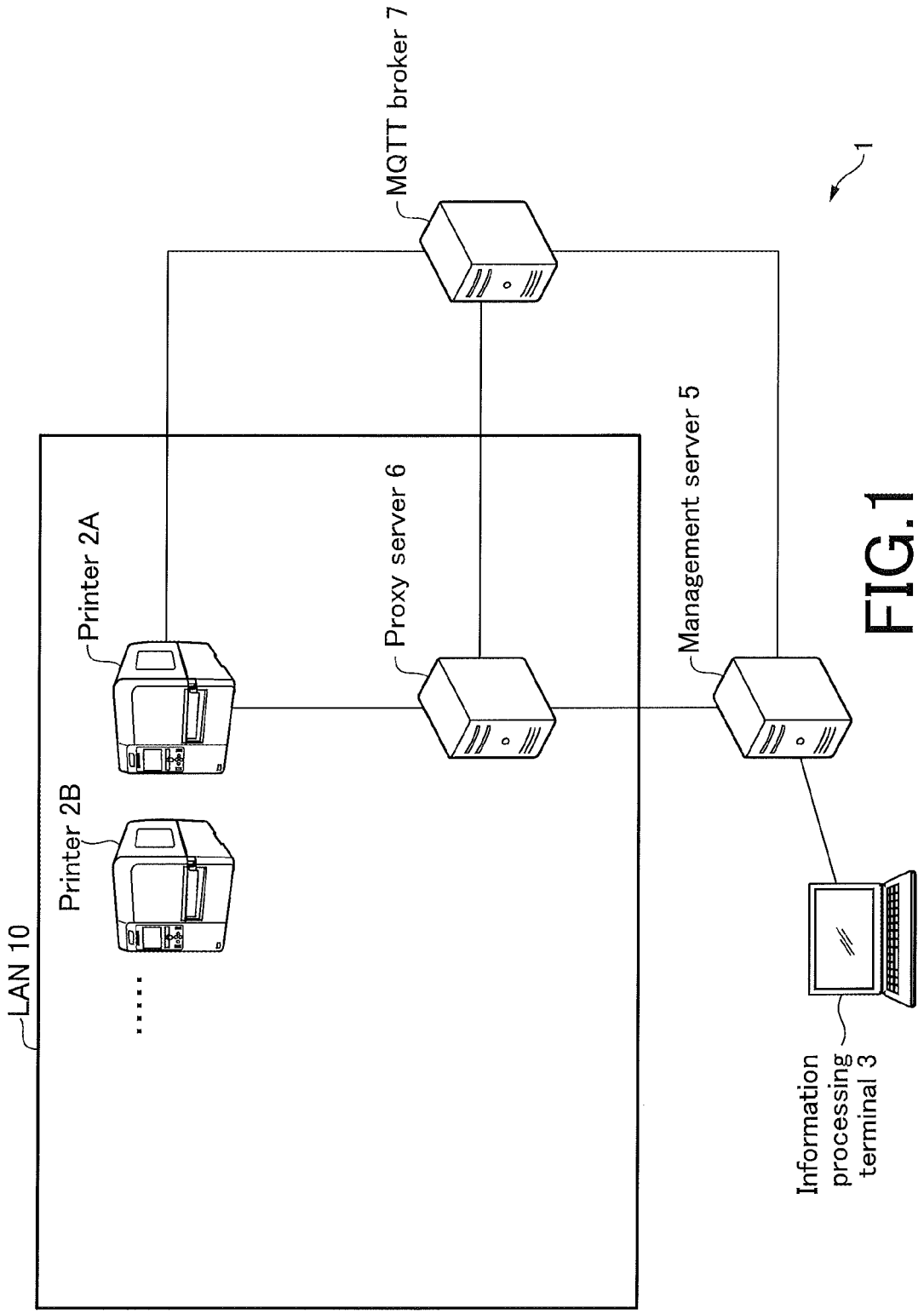
FIG. 1 shows a system configuration of an information processing system according to a first embodiment.
Figure 2:
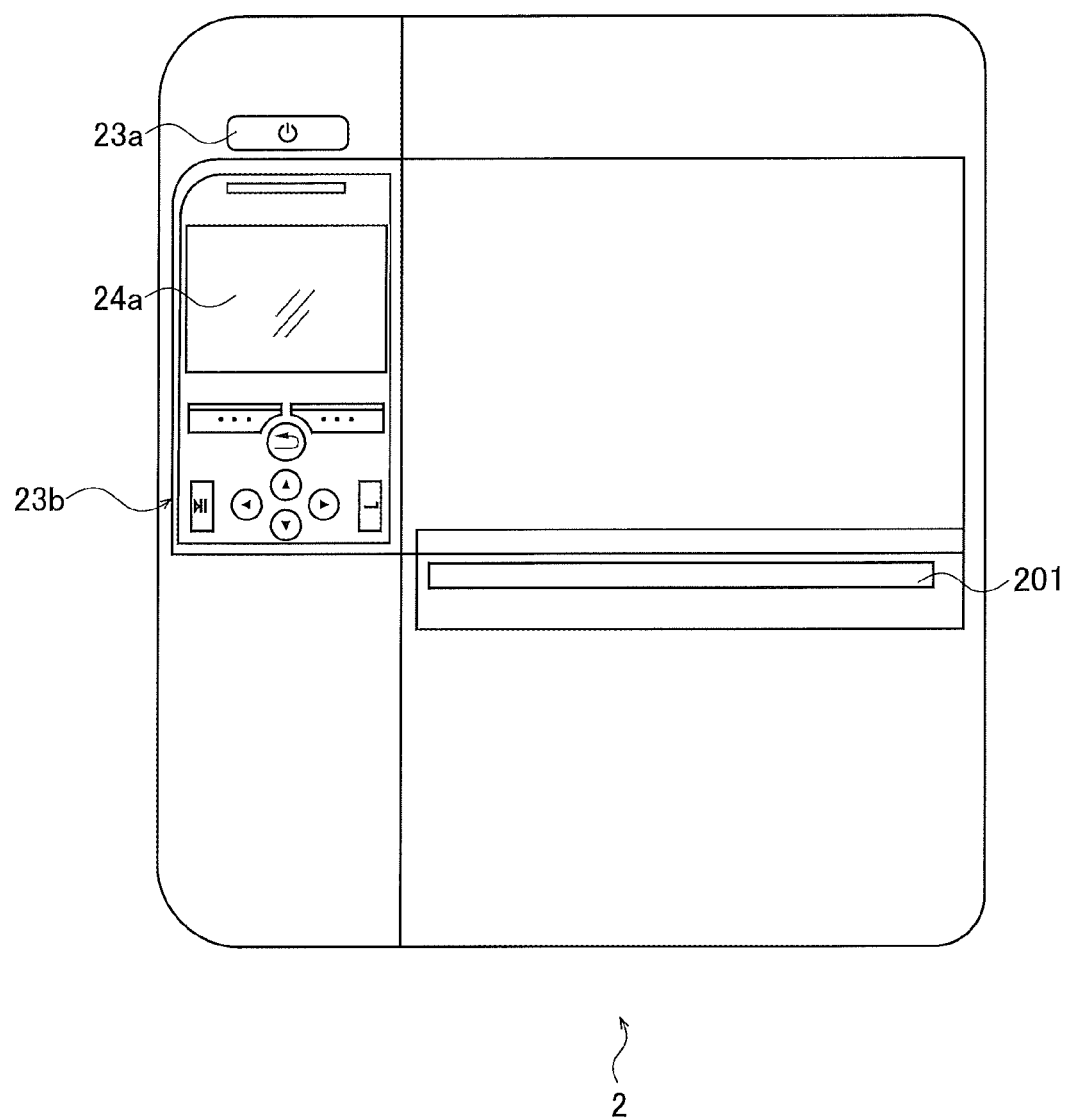
FIG. 2 shows a front view of a printer according to the first embodiment.

The information processing system 1 according to the present embodiment will be described with reference to FIGS. 1 and 2. FIG. 1 shows a general system configuration of the information processing system 1 according to a first embodiment. FIG. 2 shows a front view of a printer according to the first embodiment. The information processing system 1 of FIG. 1 includes printers 2A, 2B, . . . , an information processing terminal 3, a management server 5, a proxy server 6, and a MQTT broker 7.

The printers 2A, 2B, . . . in the information processing system 1 of FIG. 1 is connected to a local area network (LAN) 10. Each printer prints information on a label and issues the label, for example. Each apparatus in the LAN 10 including the printers 2A, 2B, . . . communicates with an apparatus connected to a network outside of the LAN 10. A firewall, which is provided to a router (not illustrated) or the proxy server 6, is configured to block communication (access with MQTT communication, for example) to any apparatus connected to the LAN 10, from the outside of the LAN 10. The proxy server 6 is configured to perform relay communication between the LAN 10 and Internet.

The management server 5, which is a so-called "cloud server", receives a message periodically or non-periodically from each of the printers 2A, 2B, . . . to manage an operation status of each printer.

It should be noted that each of the printers 2A, 2B, . . . connected to the LAN 10 will be hereinafter collectively represented as "printer 2" when referred to common issues to the printers.

The printer 2 is capable of communicating with the management server 5 using Message Queuing Telemetry Transport (MQTT) communication, Hyper Text Transfer Protocol Secure (HTTPS), MQTT over Web Socket, or the like. "MQTT" is a lightweight message queue protocol for publish-subscribe type data distribution using TCP/IP. A port number "8883" is allocated for "MQTT" to realize MQTT communication. "HTTPS" realizes HTTP communication securely. A port number "443" is allocated for MQTT over WebSocket to realize MQTT communication through a web browser.

When communicating using MQTT (port: 8883), the printer 2 communicates with the management server 5 via the MQTT broker 7, without the proxy server 6. The MQTT broker is a server that transports messages from a publisher to a subscriber in compliance with MQTT protocol.

When communicating using HTTPS (port: 443) or MQTT over WebSocket (port: 443), the printer 2 communicates with the management server 5 via the proxy server 6.

As illustrated in FIG. 2, a power button 23a, an operation panel 23b, a display panel 24a, and a label outlet 201 are provided on a front face of the printer 2.

The power button 23a is a button for activating power of the printer 2. The display panel 24a is a display panel for providing image information to a user, and may be a liquid crystal panel (LCD) for example.

The operation panel 23b includes a plurality of operation buttons for: selecting an item in a menu screen displayed on the display panel 24a; selecting a function among a plurality of functions; or instructing the printer 2 to perform a predetermined process.

The information processing terminal 3 is remotely situated from the printer 2 for example. The information processing terminal 3 may be a desktop, laptop, or tablet-type computer device, etc. having a communication function. In the information processing system 1 according to the present embodiment, the information processing terminal 3 is a help desk terminal with which one can diagnose the printer 2, or a terminal of a user who wishes to check a screen of the printer 2. Such user may work abroad collaboratively with a user of the printer 2.

In the present embodiment, a user of the information processing terminal 3 does not recognize a private address of the printer 2 connected to the LAN 10. Thus, the user cannot directly access the printer 2 with the information processing terminal 3 via HTTP/HTTPS communication.

In light of the above, the printer 2 and the information processing terminal 3 are arranged to share screen image data. This arrangement will be described later.

(1-2) Block Diagram of Each Apparatus in Information Processing System 1

Figure 3A:
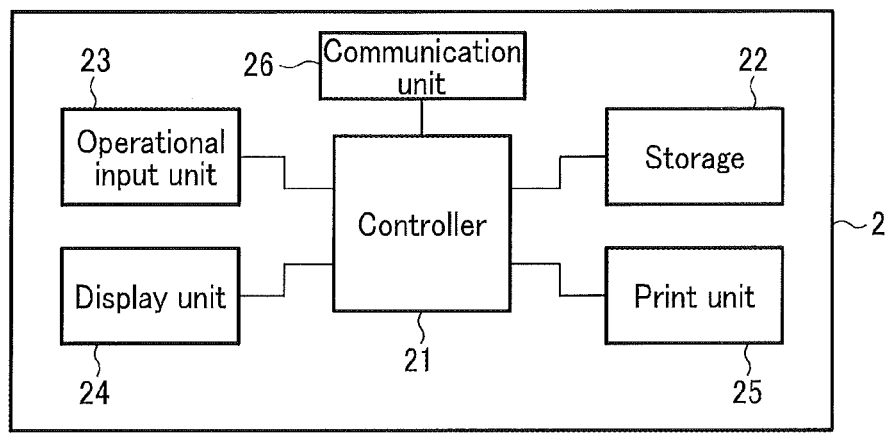
FIG. 3A shows a block diagram of the printer in the information processing system according to the first embodiment.
Figure 3B:
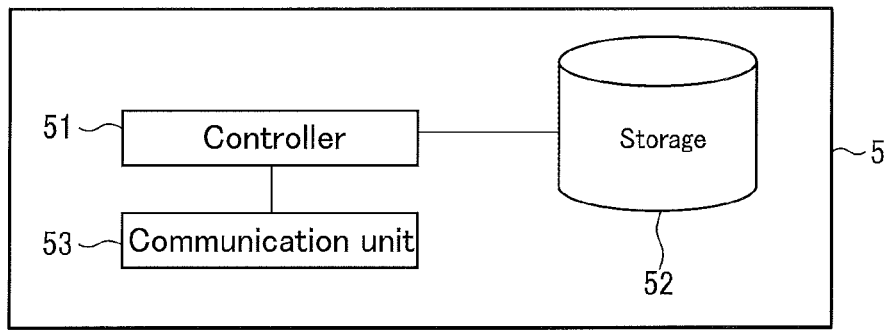
FIG. 3B shows a block diagram of a management server in the information processing system according to the first embodiment.
Figure 3C:
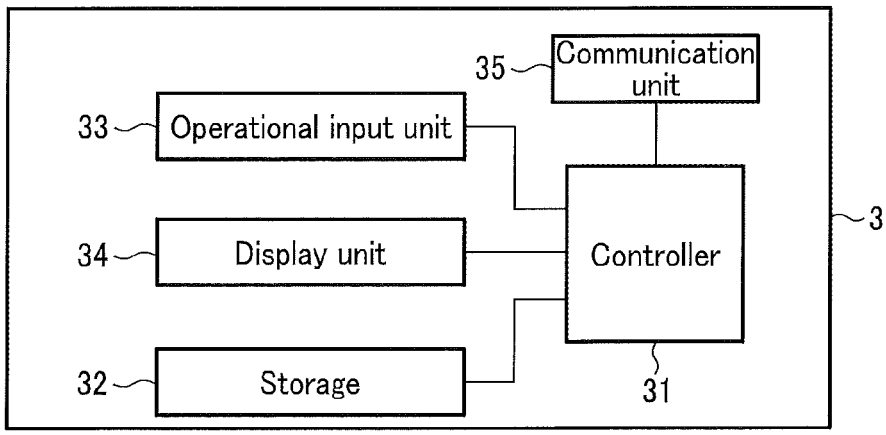
FIG. 3C is a block diagram of an information processing terminal in the information processing system according to the first embodiment.

Next, internal structure of each apparatus of the information processing system 1 according to the present embodiment will be described with reference to FIGS. 3A to 3C. FIGS. 3A to 3C are block diagrams of the printer 2, the management server 5, and the information processing terminal 3 respectively in the information processing system 1 according to the present embodiment.

(1-2-1) Printer 2

As illustrated in FIG. 3A, the printer 2 includes a controller 21, a storage 22, an operational input unit 23, a display unit 24, a print unit 25, and a communication unit 26.

The controller 21 includes a microcontroller and memories (namely, a random access memory (RAM) and a read-only memory (ROM)) to control operations of the printer 2. The microcontroller loads a firmware from the ROM when the printer 2 is activated, and executes the firmware. Functions realized by execution of the firmware include: a function for generating print data to be provided to the print unit 25; a function for updating a screen of the display unit 24 based on input signals from the operational input unit 23; and a function for generating image data in response to a command from the outside, etc.

The storage 22 is a storage device such as a hard disk drive (HDD) or a solid state drive (SDD).

The operational input unit 23 includes the power button 23a, the display panel 24a, which are illustrated in FIG. 2, and an input interface circuit.

The display unit 24 includes the display panel 24a, which is illustrated in FIG. 2, and a drive circuit that displays image (image of the screen) on the display panel 24a. The display unit 24 is configured to display an operation status of the printer 2, a menu screen, and a variety of messages such as error messages, etc.

The print unit 25 includes an ink ribbon, a thermal head having a plurality of heating elements, and a stepping motor (not illustrated) for driving a platen roller to rotate. The print unit 25 is configured to print information on a label as print medium. The print unit 25 causes current to flow through the heating elements of the thermal head selectively, based on the print data. The heating elements heated by the current are pushed, through the ink ribbon, to the label that is fed by the platen roller, and then, color is developed at a portion of the label to which the heating elements are pushed, thereby printing information on the label.

The communication unit 26 is configured to communicate with the external apparatus via MQTT (port: 8883), HTTPS (port: 443), or MQTT over WebSocket (port: 443), etc. When communicating using MQTT (port: 8883), the communication unit 26 communicates with the management server 5 via the MQTT broker 7. When communicating using HTTPS (port: 443) or MQTT over Web Socket (port:

443), the communication unit 26 communicates with the management server 5 via the proxy server 6.

(1-2-2) Management Server 5

As illustrated in FIG. 3B, the management server 5 includes a controller 51, a storage 52, and a communication unit 53.

The controller 51 includes a microcontroller and memories (namely, a RAM and a ROM) to control operations of the management server 5. The storage 52 is a large-sized storage device such as a hard disk drive (HDD) to store a variety of databases. The variety of databases may include a database having data of an apparatus name, a connection type, a model name, a status, an installation location, and an operation status for each of a plurality of printers to be managed, that is, the plurality of printers 2A, 2B, . . . connected to the LAN 10.

The controller 51 periodically or non-periodically receives data of a status and an operation status of the printer 2, and updates the database in the storage 52 accordingly.

The communication unit 53 is configured to communicate with the printer 2 via the proxy server 6 using HTTPS (port: 443) or MQTT over WebSocket (port: 443), or communicate with the printer 2 via the MQTT broker 7 using MQTT (port: 8883) for example. Further, the communication unit 53 is configured to communicate with the information processing terminal 3 using HTTPS (port: 443) for example.

The controller 51 records screen image data in the storage 52. The screen image data is uploaded from the printer 2. In response to a screen image data request from the information processing terminal 3, the controller 51 transmits screen image data of the printer 2 stored in the storage 52, to the information processing terminal 3.

(1-2-3) Information Processing Terminal 3

As illustrated in FIG. 3C, the information processing terminal 3 includes a controller 31, a storage 32, an operational input unit 33, a display unit 34, and a communication unit 35.

The controller 31 includes a microcontroller and memories (namely, a RAM and a ROM) to control operations of the information processing terminal 3. A web application for printer management (hereinafter referred to simply as "web application"), which is used on a web browser for example, is installed in the information processing terminal 3.

When predetermined processing is executed by the web application, the web browser acquires data of statuses of the printers 2A, 2B, . . . stored in the management server 5. Then, the web browser acquires data of an operation status of any printer selected from the printers 2A, 2B, . . . , and displays the acquired data on the display unit 34.

Meanwhile, when the web application executes predetermined processing, the web browser acquires screen image data from the management server 5 and displays the screen image on the display unit 34. The screen image data is uploaded by the printer 2 to the management server 5.

The controller 31 functions as a request unit configured to request the management server 5 to acquire screen image data (exemplary information that have been displayed on a display screen) of the printer 2.

The controller 31 functions as an acquisition unit configured to acquire the screen image data of the printer 2 based on a request from the request unit.

The controller 31 functions as a display control unit configured to control the display unit 34 to display the screen image data acquired by the acquisition unit.

The storage 32 is a storage device such as a SSD to store the web browser and the web application.

The operational input unit 33 is an input interface configured to receive an operational input from a user. The operational input unit 33 receives an operational input for a button operation to activate the information processing terminal 3, and an operation input for executing the web browser and the web application, etc. The display unit 34 includes a liquid crystal display panel and a drive circuit that displays image, for example.

The communication unit 35 is configured to communicate with the management server 5 using HTTPS (port: 443) for example.

(1-3) Behavior of Information Processing System

Next, a behavior of the information processing system 1 will be described with reference to FIGS. 4 to 7.

Figure 4:
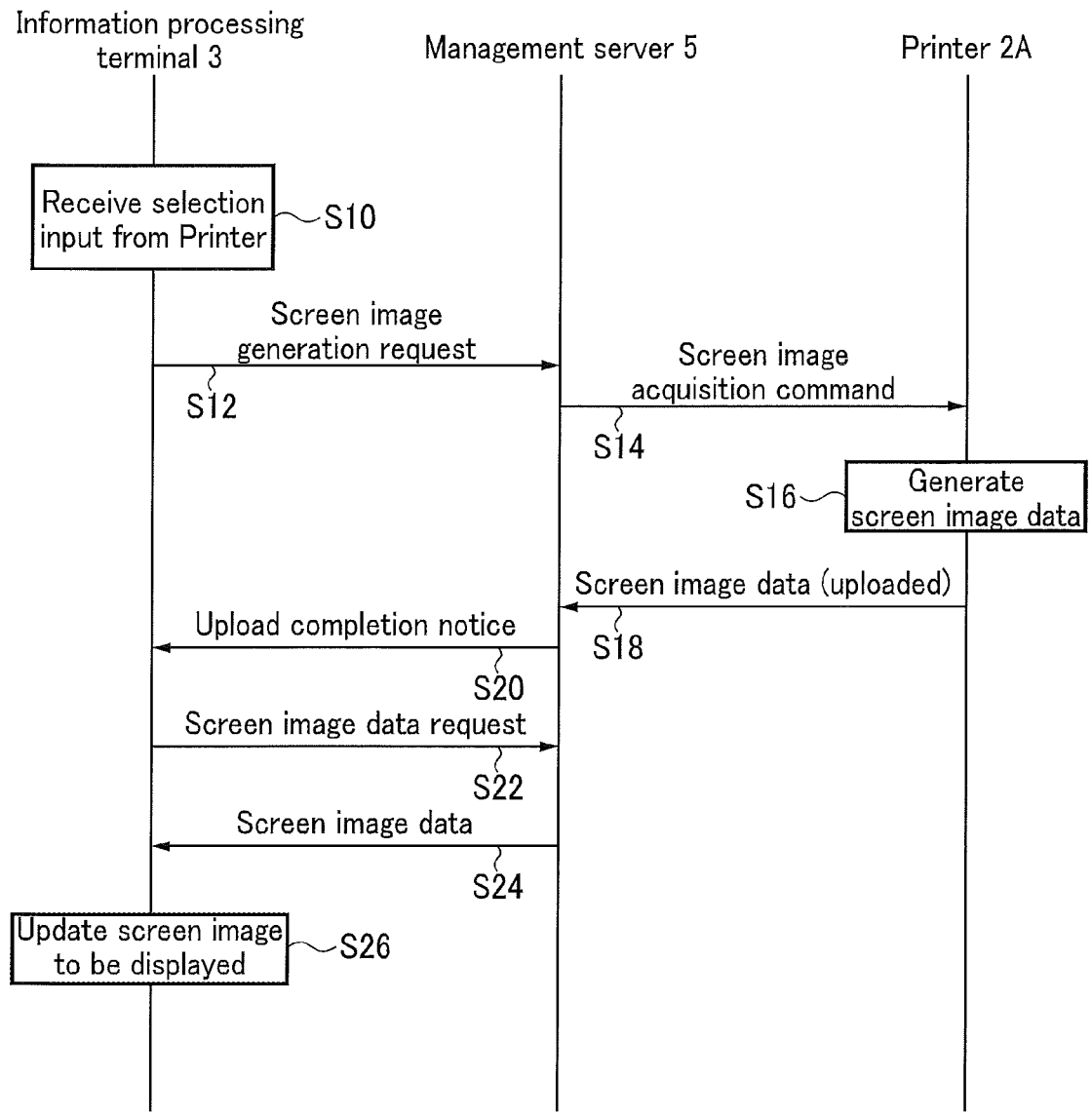
FIG. 4 is a sequence chart indicating a behavior of the information processing system according to the first embodiment.
Figure 6:
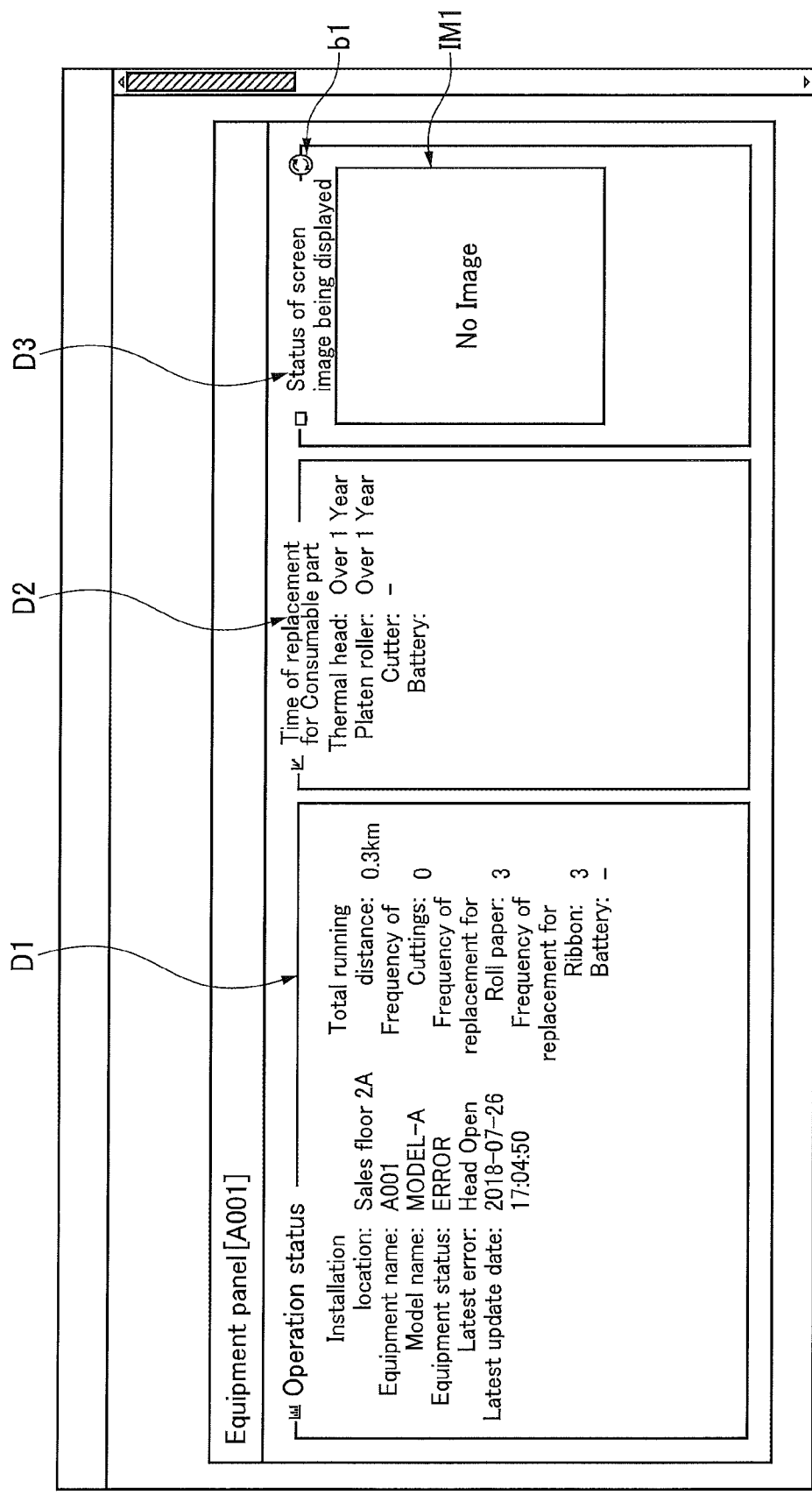
FIG. 6 shows an example of a screen displayed on the information processing terminal according to the first embodiment.
Figure 7:
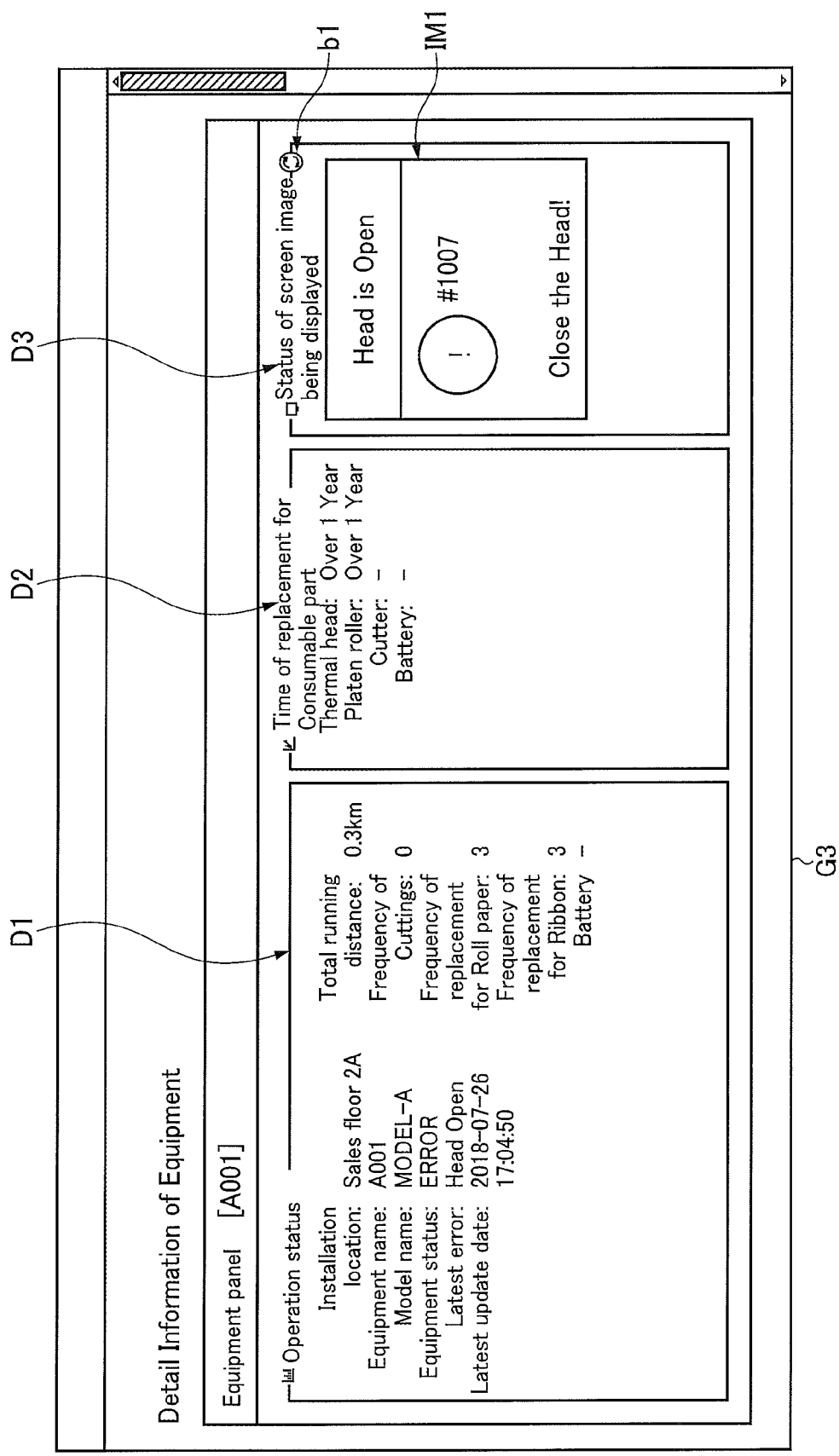
FIG. 7 shows an example of a screen displayed on the information processing terminal according to the first embodiment.

FIG. 4 is a sequence chart indicating the behavior of the information processing system 1 according to the first embodiment. Each of FIGS. 5 to 7 shows an example of a screen displayed on the information processing terminal 3 according to the first embodiment. It is to be noted that the controller 31 of the information processing terminal 3 executes the web application, which represents a behavior of the web browser, in the sequence chart of FIG. 4.

The sequence chart of FIG. 4 represents an exemplary case in which a user of the information processing terminal 3 wishes to check a screen of the printer 2A among the plurality of printers 2A, 2B, . . . connected to the LAN 10. In such case, the user of the information processing terminal 3 performs an operation to select the printer 2A on the web application.

Base on the operation, the web browser acquires, from the management server 5, data of each printer in the database stored in the management server 5, and displays a list of the acquired data as shown in a screen G1 of FIG. 5.

When receiving a selection input for selecting a printer from the list of printers displayed in the screen G1 (step S10), the web browser of the information processing terminal 3 displays data acquired from the management server 5 with regard to the selected printer (referred to hereinafter printer 2A), as shown by an example in a screen G2 of FIG. 6.

For example, the screen G2 includes, with regard to the selected printer 2A, a display area D1 indicating an operation status, a display area D2 indicating time of replacement for consumable parts, and a display area D3 indicating a display status. The display area D3 includes an image IM1 representing the screen of the selected printer 2A and an update button b1 for updating the image IM1.

No image is being displayed as the image IM1 in the screen G2 at this time, since the web browser of the information processing terminal 3 has not acquired screen image data of the printer 2A from the management server 5.

When the update button b1 is operated by the user, the web browser of the information processing terminal 3 transmits a screen image generation request to the management server 5 (step S12). The screen image generation request includes information identifying the printer 2A. When receiving the screen image generation request from the information processing terminal 3, the management server 5 transmits a screen image acquisition command to the printer 2A via the MQTT broker 7 using MQTT (port: 8883) for example (step S14).

In response to the screen image acquisition command, the printer 2A generates screen image data (that is, image data of the screen of the printer 2A), and then transmits the screen image data to the management server 5 using MQTT (port: 8883) for example (step S18). In other words, the screen image data is uploaded by the printer 2A.

It should be noted that, when the port 8883 is blocked at the printer 2A, communication between the printer 2A and the management server 5 may be performed via the proxy server 6 using HTTPS (port: 443) for example.

Once the screen image data is uploaded, the management server 5 records the screen image data in the storage 52, and transmits a upload completion notice to the information processing terminal 3 (step S20).

At step S20, the information processing terminal 3 recognizes that the screen image data corresponding to the screen image generation request has been available. The information processing terminal 3 then transmits a screen image data request to the management server 5 (step S22). The management server 5 responds to the request by transmitting a HTML document including the screen image data (step S24).

The web browser of the information processing terminal 3 analyzes the HTML document which it receives at step S24, and updates the screen of the web application (step S26). For example, the image IM1 in the screen G2 of FIG. 6 has been updated to that in a screen G3 of FIG. 7. In the example of FIG. 7, a warning indication image is displayed as a screen of the printer 2A.

As described above, according to the information processing system 1 of the present embodiment, even when the information processing terminal 3, which is situated outside of the LAN 10 to which the printer 2 is connected, does not know a private address of the printer 2, the information processing terminal 3 is able to acquire screen image data of the printer 2 via the management server 5 and display the acquired screen image data. The screen image data is displayed by the web browser, as if the screen image data was acquired and displayed through public internet communication. Therefore, any special procedure is not required by the user of the information processing terminal 3.

(2) Second Embodiment

Next, the information processing system according to the second embodiment of the present invention will be described. It is to be noted that identical elements in the present embodiment to those in the first embodiment will be denoted by the identical signs, and redundant explanation to the identical elements will be omitted.

Figure 8:
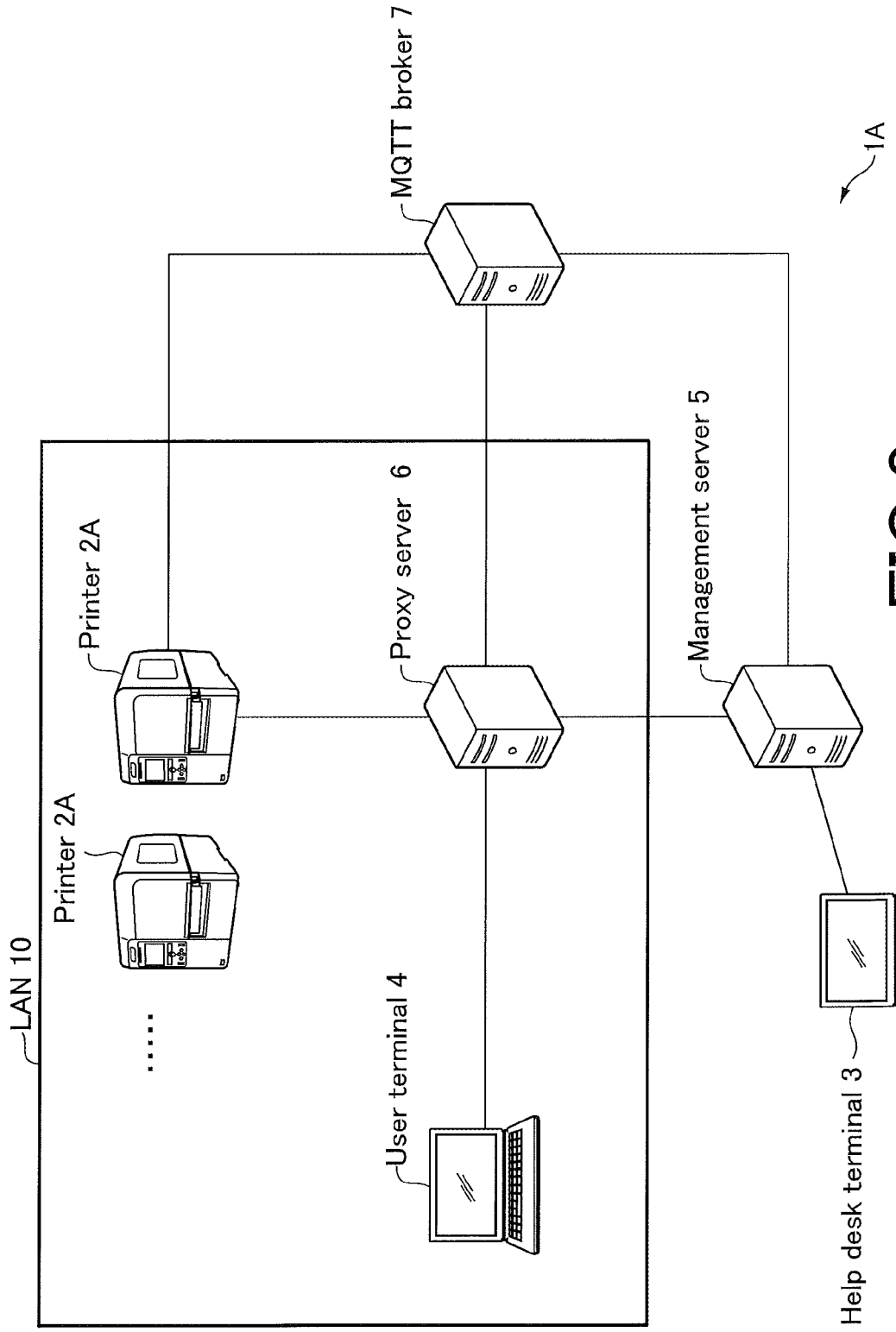
FIG. 8 shows a system configuration of an information processing system according to a second embodiment.

The information processing system 1A according to the second embodiment will be described with reference to FIG. 8. FIG. 8 shows a general system configuration of the information processing system 1A according to the second embodiment.

The information processing system 1A according to the present embodiment is configured such that a help desk terminal, which is situated outside of the LAN 10 to which the printer 2 is connected, is able to remotely operate the printer 2, even when the help desk terminal does not know a private address of the printer 2. Since the help desk terminal may include the identical configuration to the information processing terminal 3 of the first embodiment, the help desk terminal is denoted as "help desk terminal 3" in the present embodiment. The web application referred to in the first embodiment is installed in the help desk terminal 3.

Although the user terminal 4 is connected to the LAN 10 in the illustration of FIG. 8, the user terminal 4 is not essential in the present embodiment.

In the present embodiment, the controller 31 of the help desk terminal 3 functions as an operation request unit configured to request the management server 5 to operate a specific button among a plurality of buttons (exemplary operation targets) of the printer 2.

The controller 31 of the present embodiment functions as an acquisition unit configured to acquire updated screen image data from the management server 5. The updated screen image data is screen image data that has been updated from the previous screen image data based on an operation request from the operation request unit.

The controller 31 of the present embodiment functions as a display control unit configured to control the display unit 34 to display the updated screen image data acquired by the acquisition unit.

Next, a behavior of the information processing system 1A will be described with reference to FIGS. 9 to 12.

Figure 9:
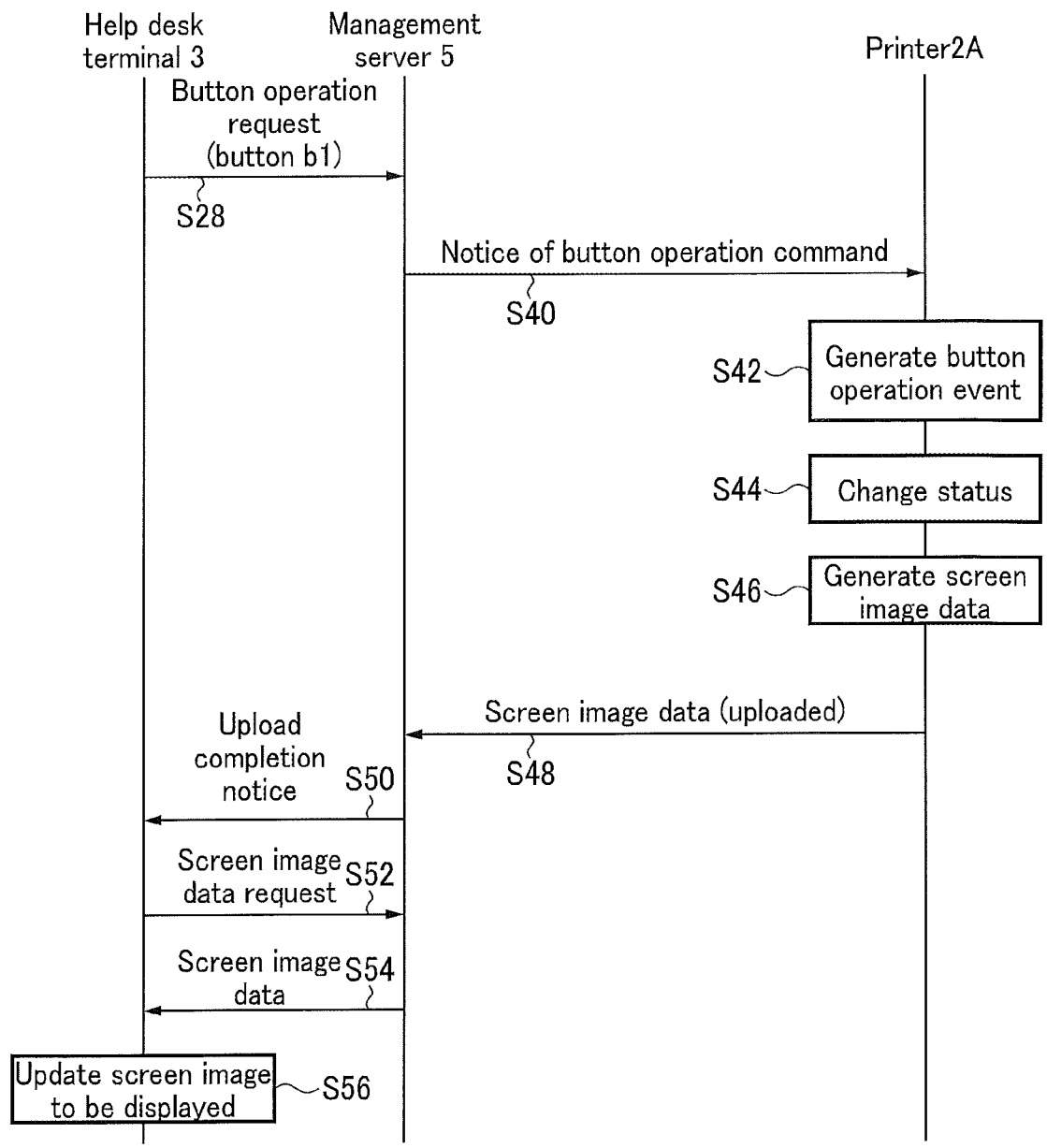
FIG. 9 is a sequence chart indicating a behavior of the information processing system according to the second embodiment.
Figure 10:
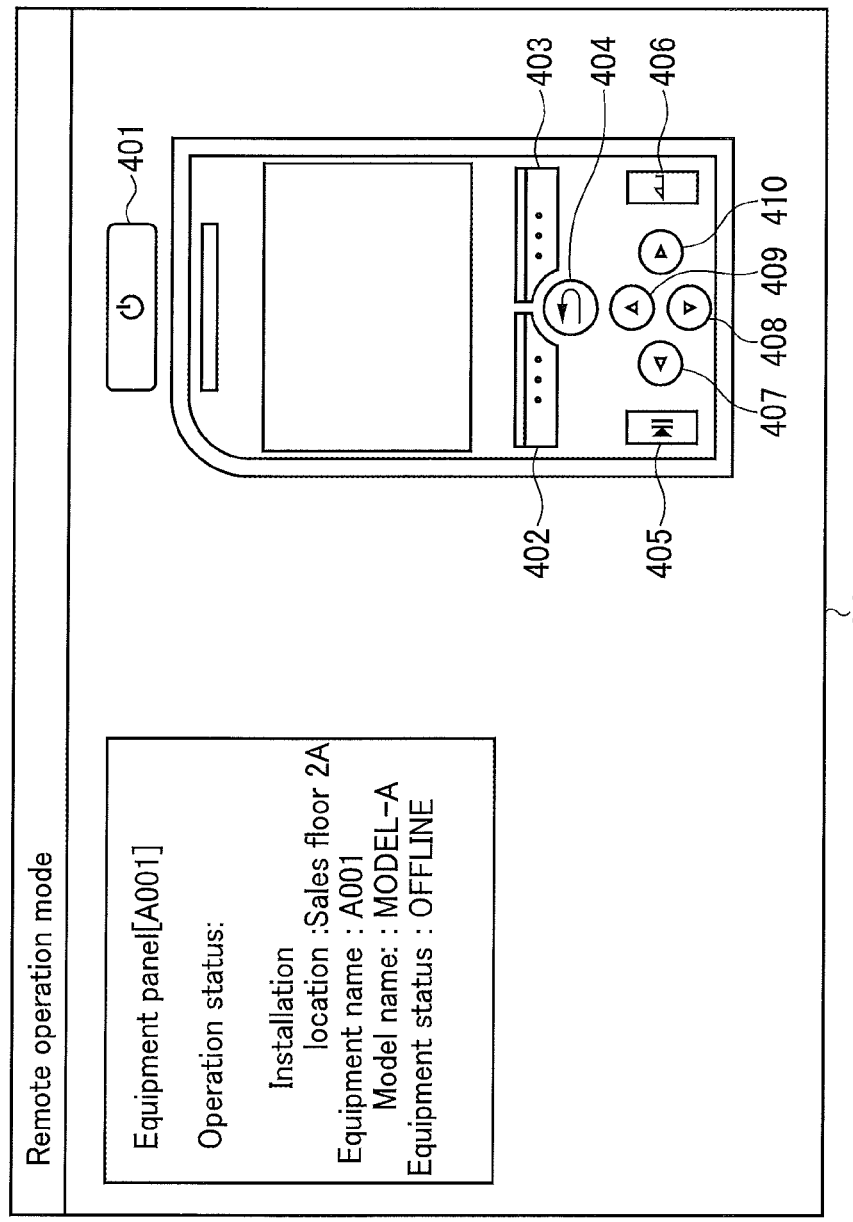
FIG. 10 shows an example of a screen displayed on a help desk terminal in the information processing system according to the second embodiment.
Figure 11:
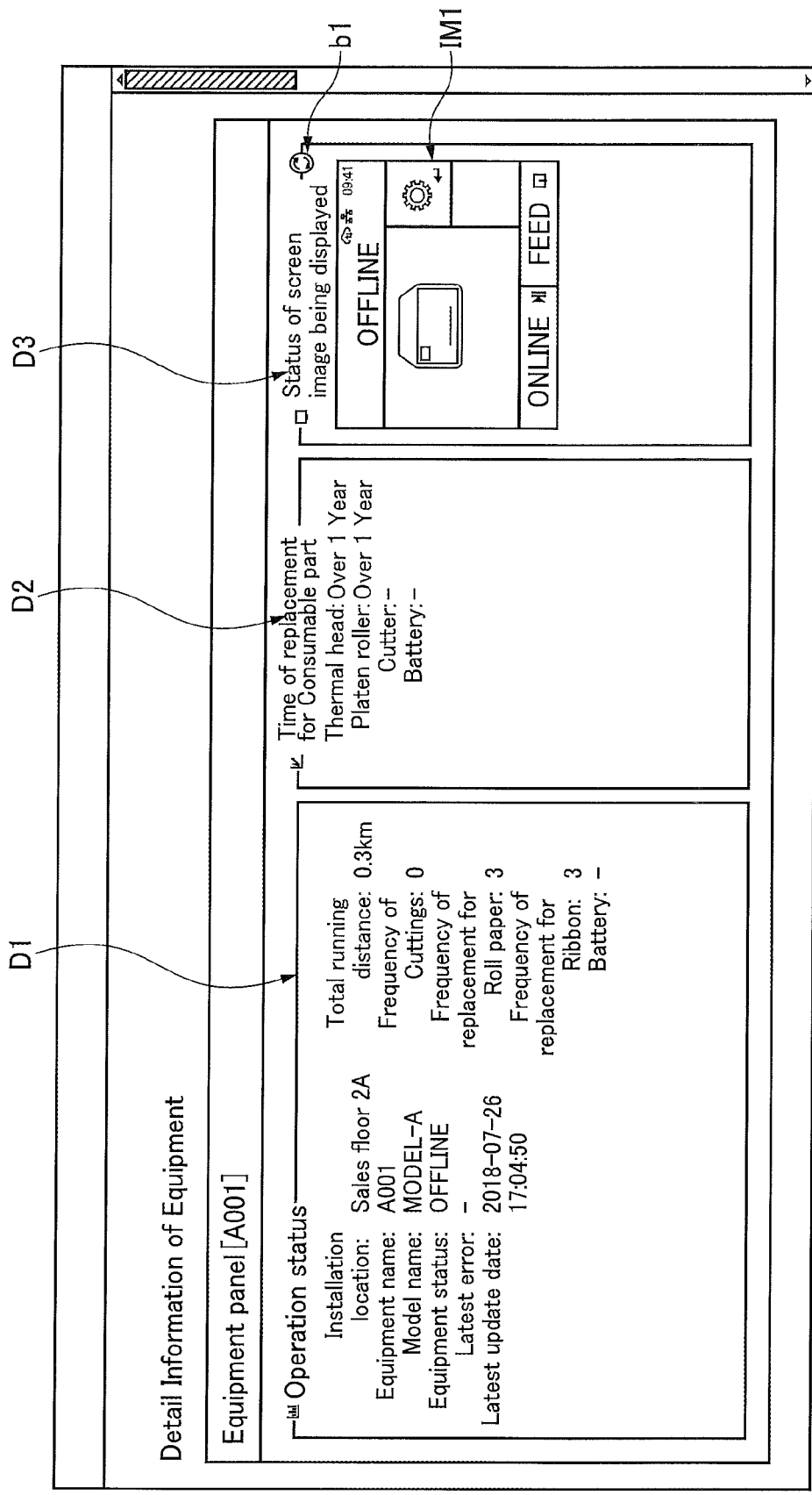
FIG. 11 shows an example of a screen displayed on the help desk terminal according to the second embodiment.
Figure 12:
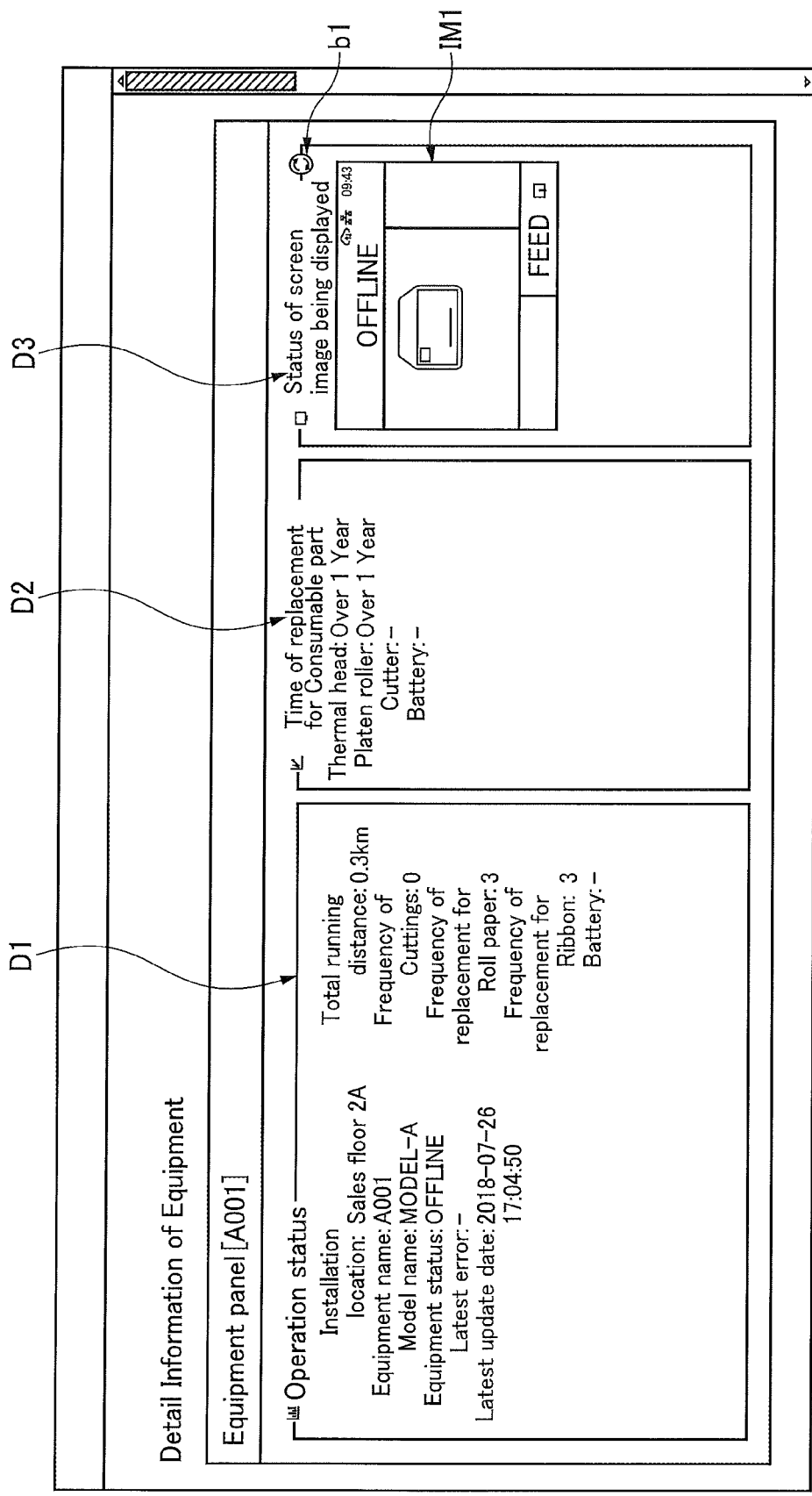
FIG. 12 shows an example of a screen displayed on the help desk terminal according to the second embodiment.

FIG. 9 is a sequence chart indicating the behavior of the information processing system 1A according to the present embodiment. FIG. 10 shows an example of a screen displayed on the help desk terminal 3 (remote operation mode) according to the present embodiment. FIG. 11 shows an example of a screen displayed on the help desk terminal 3 (before the screen of the printer 2A has been updated) according to the present embodiment. FIG. 12 shows an example of a screen displayed on the help desk terminal 3 (after the screen of the printer 2A has been updated) according to the present embodiment.

When a person in charge of the help desk terminal 3 tries to operate the printer 2A on the user of the printer 2A behalf, the person selects the printer 2A among the plurality of printers 2A, 2B, . . . on the web application, and performs a remote operation mode. The remote operation mode is one of the functions that the web application provides. With the remote operation mode, an image is displayed as shown in a screen G4 of FIG. 10 as an example. In this image, layout of the power button 23a and the operation panel 23b (see FIG. 2) of the selected printer 2A is emulated. The image includes software keys 401 to 404 that correspond to respective buttons of the printer 2A.

When any key is selected among the software keys 401 to 404, the web browser of the help desk terminal 3 transmits a button operation request the management server 5 (step S28). The button operation request includes information of the button that corresponds to the selected key. When receiving the button operation request, the management server 5 transmits a button operation command to the printer 2A (step S40). In the button operation command, the selected button is identified.

In response to the button operation command, the firmware of the printer 2A generates a button operation event with respect to the selected button (step S42).

Based on the button operation event, the firmware of the printer 2A updates the status of the printer 2A as if the selected button was actually operated (step S44), and generates screen image data with respect to a screen after the status has been updated (step S46).

The printer 2A then transmits the screen image data, which is generated at step S46, to the management server 5 (step S48). That is, the screen image data is uploaded by the printer 2A.

It should be noted that, when the port 8883 is blocked at the printer 2A, communication between the printer 2A and the management server 5 may be performed via the proxy server 6 using HTTPS (port: 443) for example.

Once the screen image data is uploaded, the management server 5 records the screen image data in the storage 52, and transmits an upload completion notice to the help desk terminal 3 (step S50).

Due to step S50, the help desk terminal 3 recognizes that the screen image data corresponding to the button operation request has been available. The help desk terminal 3 then transmits a screen image data request to the management server 5 (step S52). The management server 5 responds to the request by transmitting a HTML document including the screen image data (step S54).

The web browser of the help desk terminal 3 analyzes the HTML document which it receives at step S54, and updates the screen of the web application (step S56). For example, when the software key 403 (see FIG. 10) has been selected in the remote operation mode on the screen G5 of FIG. 11, an operation to a button corresponding to the software key 403 (that is, a button to which a feed operation is allocated) can be performed from the help desk terminal 3, which is remotely situated from the printer 2A. Consequently, as shown in a screen G6 of FIG. 12, a screen of the printer 2A indicating a feed operation is displayed as an image IM1.

As described above, according to the information processing system 1A of the present embodiment, even when the help desk terminal 3, which is situated outside of the LAN 10 to which the printer 2 is connected, does not know a private address of the printer 2, the help desk terminal 3 is able to remotely perform an operation of the printer 2 via the management server 5.

(3) Third Embodiment

Next, the information processing system according to the third embodiment of the present invention will be described. It is to be noted that identical elements in the present embodiment to those in the first or the second embodiment will be denoted by the identical signs, and redundant explanation to the identical elements will be omitted.

The information processing system according to the present embodiment is the same as that according to the second embodiment in that the help desk terminal 3 remotely performs an operation of the printer 2 via the management server 5. Different from the second embodiment is that, in the third embodiment, a user terminal 4 (exemplary user terminal device) connected to the LAN 10 is involved. It is to be noted that a system configuration of the information processing system according to the present embodiment is as shown in FIG. 8.

In the present embodiment, the help desk terminal 3 does not select a software key corresponding to a button to be remotely operated. Rather, the help desk terminal 3 serves to support a user of the user terminal 4 connected to the LAN 10 in operating a software key. An operation of a software key (that is, an operation of a software key corresponding to a button to be remotely operated) is performed by the user terminal 4. In response to the operation to the software key by the user terminal 4, the corresponding remote operation to the printer 2 is performed. In order to realize this scheme, the web application, which has been referred to in the first embodiment, is installed in both the help desk terminal 3 and the user terminal 4.

FIGS. 13A to 13D show structures of respective apparatuses in the information processing system according to the present embodiment. The printer 2, the management server 5, and the help desk terminal 3, which are respectively shown in FIG. 13A, FIG. 13C, FIG. 13D, have been explained with reference to FIG. 3A, FIG. 3B, FIG. 3C respectively.

Figure 13A:
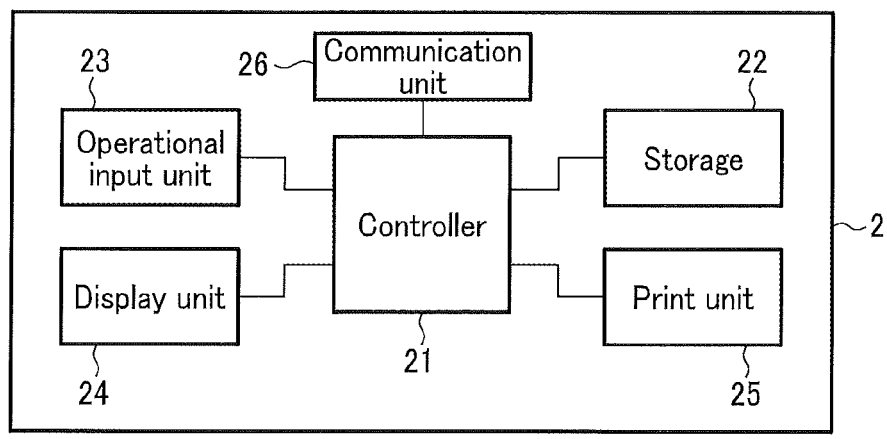
FIG. 13A shows a block diagram of a printer in an information processing system according to a third embodiment.
Figure 13B:
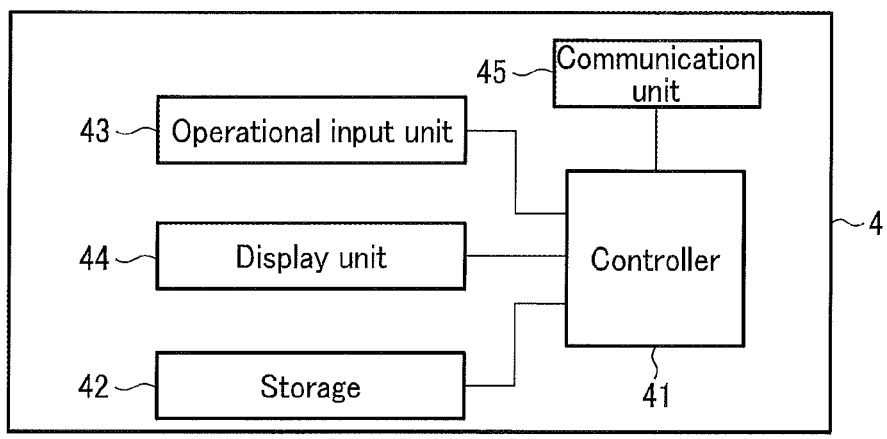
FIG. 13B shows a block diagram of a user terminal in the information processing system according to the third embodiment.
Figure 13C:
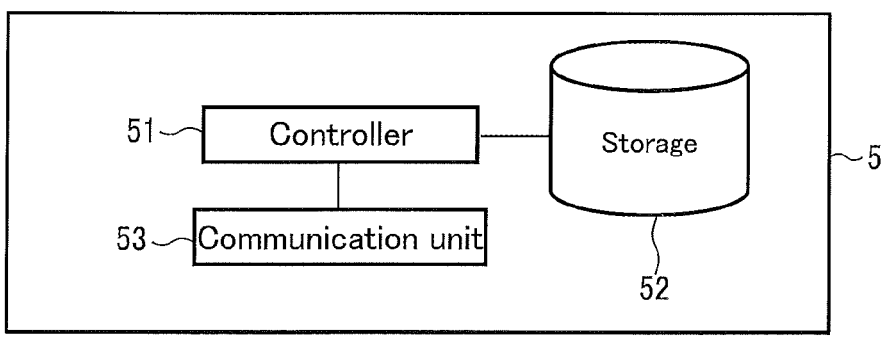
FIG. 13C shows a block diagram of a management server in the information processing system according to the third embodiment.
Figure 13D:
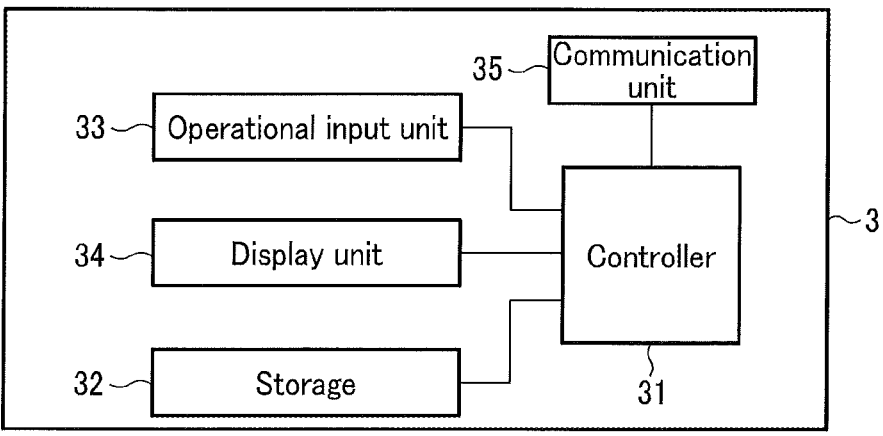
FIG. 13D is a block diagram of a help desk terminal in the information processing system according to the third embodiment.

As shown in FIG. 13B, the user terminal 4 includes a controller 41, a storage 42, an operational input unit 43, a display unit 44, and a communication unit 45 (exemplary fourth communication unit).

The controller 41 includes a microcontroller and memories (namely, a RAM and a ROM) to control operations of the user terminal 4. The same web application as that installed in the help desk terminal 3 is also installed in the user terminal 4.

The storage 42 is a storage device such as a SSD to store a web browser and the web application.

The operational input unit 43 is an input interface configured to receive an operational input from a user. For example, the operational input unit 43 receives an operational input for a button operation to activate the user terminal 4, an operation input for executing the web browser and the web application, etc. The display unit 44 includes a liquid crystal display panel and a drive circuit that displays image, for example.

The communication unit 45 is configured to communicate with the printer 2 in the LAN 10, and with the management server 5 via the proxy server 6 using HTTPS (port: 443) for example.

The controller 31 of the help desk terminal 3 functions as a display style change request unit configured to request the management server 5 to display the plurality of software keys (exemplary operation targets) of the printer 2 on a display unit 44 of the user terminal 4, such that a display style of a selected software key is different from that of the software key(s) among the plurality of software keys.

The controller 31 of the help desk terminal 3 functions as an acquisition unit configured to acquire information from the management server 5. The acquired information is information (namely, updated information) that is updated based on an operation with respect to the selected software key that have been displayed on the display unit 44.

The controller 31 of the help desk terminal 3 functions as a display control unit configured to control the display unit 44 to display the updated information acquired by the acquisition unit.

Figure 14:
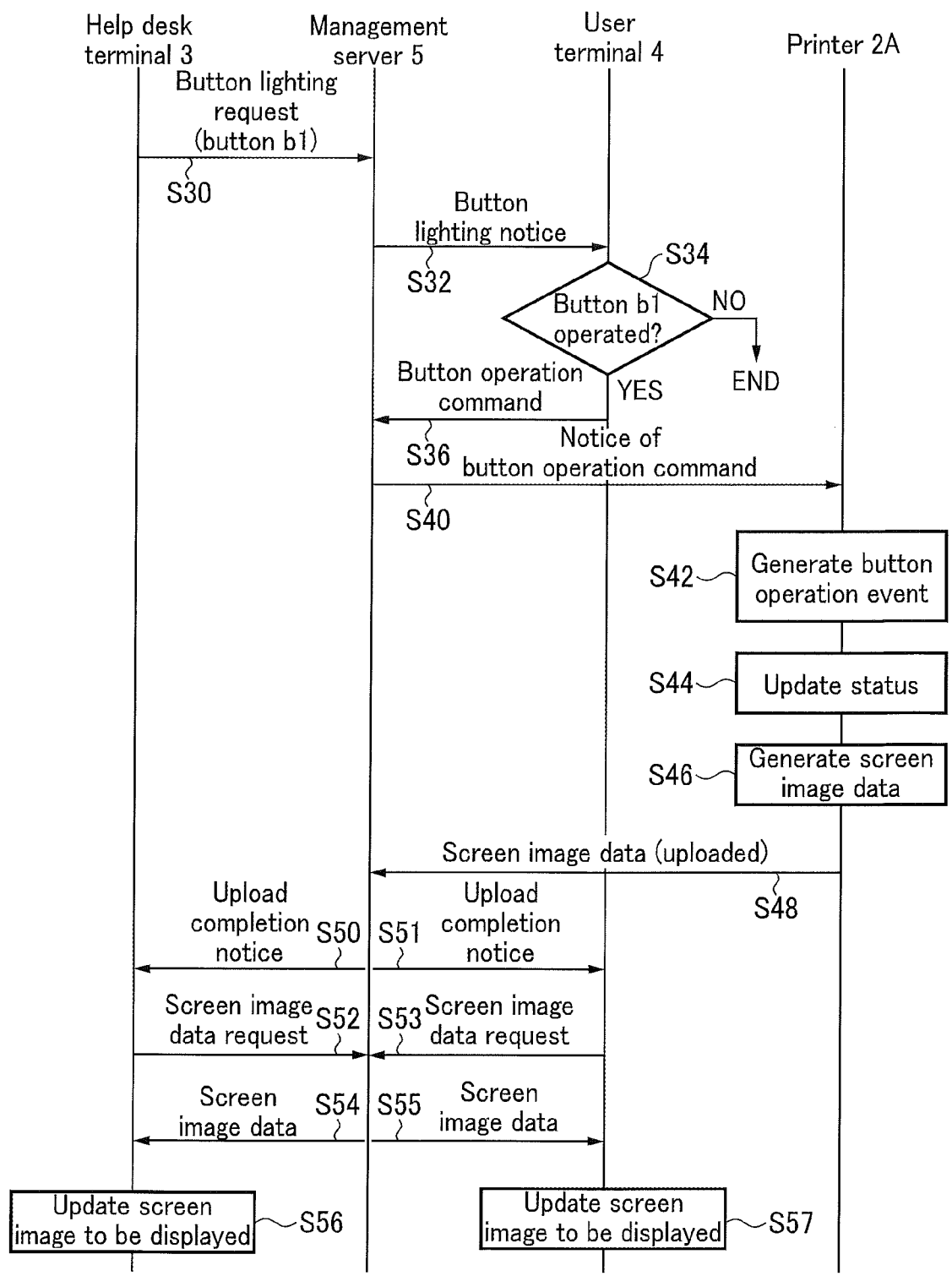
FIG. 14 is a sequence chart indicating a behavior of the information processing system according to the third embodiment.
Figure 15:
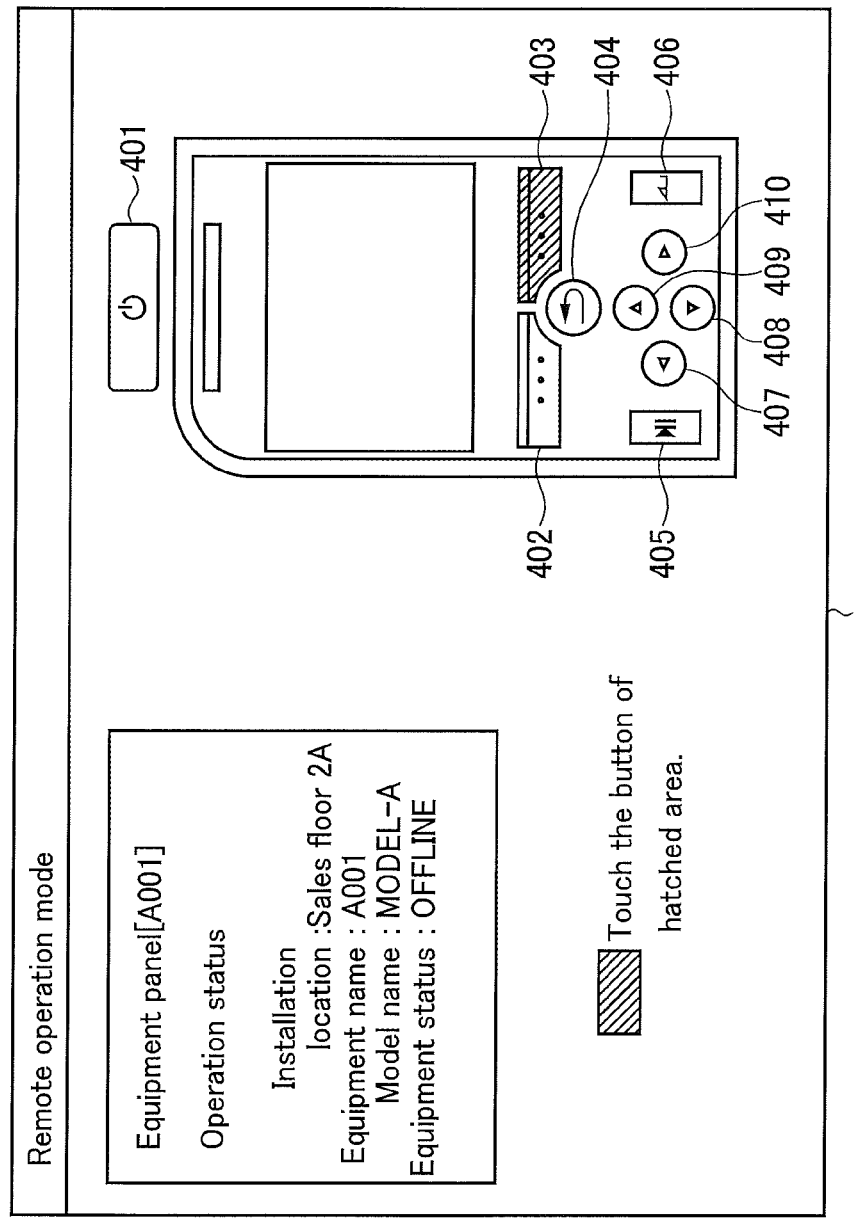
FIG. 15 shows an example of a screen displayed on the user terminal in the information processing system according to the third embodiment.

Next, a behavior of the information processing system will be described with reference to FIGS. 14 and 15. FIG. 14 is a sequence chart indicating the behavior of the information processing system according to the present embodiment. FIG. 15 shows an example of a screen displayed on the user terminal in the information processing system according to the present embodiment.

It is to be noted that processes in the sequence chart of FIG. 14 are denoted by the signs for the corresponding processes in the sequence chart of FIG. 10.

It is assumed in the sequence chart of FIG. 14 that the printer 2A has been selected in advance among the printers 2A, 2B, . . . by the help desk terminal 3 and the user terminal 4. It is also assumed that the help desk terminal 3 and the user terminal 4 performs the remote operation mode.

In the present embodiment, apart from the second embodiment, when any key is selected among the software keys 401 to 410 in the remote operation mode of FIG. 10, the web browser of the help desk terminal 3 transmits a button lighting request to the management server 5 (step S30). The button lighting request includes information regarding the selected key. The button lighting request intends to light the selected software key on the web application of the user terminal 4, in order for a user of the user terminal 4 to encourage to operate the selected software key.

When receiving the button lighting request, the management server 5 transmits a button lighting notice to the user terminal 4 (step S32). The button lighting notice includes information regarding the selected software key that has been selected at step S30.

When receiving the button lighting notice, the web browser of the user terminal 4 displays an image in the remote operation mode in such a style that the selected software key is lit. For example, a screen G7 of FIG. 15 shows an example that the software key 403 that has been selected by the help desk terminal 3 is lit.

When the lit software key is operated by the user, (step S34: YES), the web browser of the user terminal 4 transmits a button operation command to the management server 5 (step S36). The button operation command includes information regarding the operated software key. The management server 5 then transmits a notice of button operation command to the printer 2A (step S40). The notice of button operation command includes information regarding a button corresponding to software key selected at step S36.

Subsequent processes after step S42 are basically the same as those after step S42 in FIG. 9.

It is to be noted that, in FIG. 14, a displayed screen is updated not only in the help desk terminal 3, but also in the user terminal 4. That is, when the screen image data is uploaded from the printer 2A to the management server 5, the management server 5 transmits an upload completion notice to the help desk terminal 3 and the user terminal 4 (steps S50, S51). Each of the help desk terminal 3 and the user terminal 4 transmits a screen image data request to the management server 5 (steps S52, S53). The management server 5 responds to the request by transmitting a HTML document including the screen image data, to the help desk terminal 3 and the user terminal 4 (steps S54, S55).

Each of the web browsers of the help desk terminal 3 and the user terminal 4 analyzes the HTML document which each receives at steps S54, S55, and updates the screen of the web application (steps S56, S57).

Since the screen of the help desk terminal 3 is updated, a person in charge of the help desk terminal 3 is able to confirm whether or not the user has performed an appropriate operation.

As described above, with the information processing system of the present embodiment, similarly to the second embodiment, the printer 2 can be operated remotely via the management server 5. Further, in the present embodiment, since a user of the printer 2 is involved in a remote operation, the user is able to voluntarily perform an operation of the printer 2, while the help desk terminal 3 supports the user.

The embodiments of the information processing system, the information processing method, and the program according to the present invention have been described in details. However, scope of the present invention is not limited to the aforementioned embodiments described above. The aforementioned embodiments may be improved or modified in a variety of ways to such an extent that does not depart from the spirit of the present invention.

For example, the aforementioned third embodiment has disclosed an example that the screen of the user terminal 4 is displayed such that the selected software key among the plurality of software keys is lit; however, the present invention is not limited to this example. Any other displaying manner may be applied, as long as the selected software key is displayed in a different manner from the other software keys. For example, the selected software key among the plurality of software keys may be displayed in a different color, brightness, pattern, or etc.

The program according to the present invention may be stored in a non-transitory recording medium.

The invention claimed is:

1. An information processing terminal capable of communicating with printers and a server through a network, the information processing terminal comprising a processor configured to:
   receive an input of selecting a printer among a list of printers acquired from the server, when the information processing terminal is unable to access the printer, the list of printers including an equipment name and status information of each of the printers;
   request the server to acquire information regarding the selected printer and information displayed on a screen of the selected printer;
   acquire the information regarding the selected printer and the information displayed on the screen of the selected printer from the server based on a request from the processor; and
   control a display of the information processing terminal to display operation status information of the selected printer, time information of replacement for consumable parts being used in the selected printer, and information displayed on the screen of the selected printer, based on the information acquired by the processor,
   wherein the display is controlled to display an image of a plurality of hard buttons of the selected printer and emulate a layout of the plurality of hard buttons such that a user operates the selected printer by selecting a button in the image of the plurality of hard buttons,
   wherein the processor is configured to:
   control the server such that, in response to the user selecting the button among the plurality of hard buttons in the image, the selected printer updates status to generate and transmit a screen image to the server, and
   control the display of the information processing terminal to display the screen image of the selected printer.

2. The information processing terminal according to claim 1, wherein the processor is further configured to:
   make an operation request to the server to operate a specific operation target among a plurality of operation targets of the printer,
   acquire second information from the server, the second information being updated from the information regarding the selected printer and the information displayed on the screen of the selected printer, based on the operation request, and
   control the display of the information processing terminal to display the second information acquired by the processor.

3. The information processing terminal according to claim 1, wherein the processor is configured to select the printer among a plurality of printers, each printer capable of communicating with the server.

4. The information processing terminal according to claim 2, wherein the processor is configured to select the printer among a plurality of printers, each printer capable of communicating with the server.

5. An information processing terminal capable of communicating with a server, the information processing terminal comprising a processor configured to:
   request a server to acquire first information that have been displayed on a display screen of a printer capable of communicating with the server;
   acquire the first information from the server based on a request from the processor;

control a display of the information processing terminal to display the first information acquired by the processor;

request the server to display a plurality of operation targets of the printer on a display of a user terminal device capable of communicating with the server, such that a display style of a selected operation target is different from that of the other operation target(s) among the plurality of operation targets;

acquire third information from the server, the third information being updated from the first information based on an operation with respect to the selected operation target that has been displayed on the display of the user terminal device; and control the display of the information processing terminal to display the third information acquired by the processor.

6. The information processing terminal according to claim 5, wherein the processor is configured to
select the printer among a plurality of printers, each printer capable of communicating with the server.

7. An information processing method performed by an information processing terminal capable of communicating with printers and a server through a network, the information processing method comprising:

a reception step of receiving an input of selecting a printer among a list of printers acquired from the server, when the information processing terminal is unable to access the printer, the list of printers including an equipment name and status information of each of the printers;

a request step for requesting the server to acquire information regarding the selected printer and information displayed on a screen of the selected printer;

an acquisition step for acquiring the information regarding the selected printer and the information displayed on the screen of the selected printer from the server based on a request made in the request step; and a display control step for controlling a display of the information processing terminal to display operation status information of the selected printer, time information of replacement for consumable parts being used in the selected printer, and information displayed on the screen of the selected printer, based on the information acquired by the acquisition step, wherein the display control step includes:
controlling the display to display an image of a plurality of hard buttons of the selected printer and emulate a layout of the plurality of hard buttons such that a user operates the selected printer by selecting a button in the image of the plurality of hard buttons, controlling the server such that, in response to the user selecting the button among the plurality of hard buttons in the image, the selected printer updates status to generate and transmit a screen image to the server, and controlling the display of the information processing terminal to display the screen image of the selected printer.

8. The information processing method according to claim 7, further comprising an operation request step for requesting the server to operate a specific operation target among a plurality of operation targets of the printer, wherein the acquisition step acquires second information from the server, the second information being updated from the information regarding the selected printer and the information displayed on the screen of the selected printer, based on an operation made in the operation request step, and wherein the display control step controls the display of the information processing terminal to display the second information acquired by the acquisition step.

9. The information processing method according to claim 7, wherein the display control step further includes controlling the display to:
in response to a user selecting a first button in the image of the plurality of hard buttons, display an image of a printer operation corresponding to the first button.

10. An information processing method performed by an information processing terminal capable of communicating with a server, the information processing method comprising:

a request step for requesting a server to acquire first information that have been displayed on a display screen of a printer capable of communicating with the server;

an acquisition step for acquiring the first information from the server based on a request made in the request step;

a display control step for controlling a display of the information processing terminal to display the first information acquired by the acquisition step; and a display style change request step for requesting the server to display a plurality of operation targets of the printer on a display of a user terminal device capable of communicating with the server, such that a display style of a selected operation target is different from that of the other operation target(s) among the plurality of operation targets, wherein the acquisition step acquires third information from the server, the third information being updated from the first information based on an operation with respect to the selected operation target that has been displayed on the display of the user terminal device, and wherein the display control step controls the display of the information processing terminal to display the third information acquired by the acquisition step.

11. A non-transitory computer-readable recording medium that includes a program for enabling a computer to perform a method in an information processing terminal capable of communicating with printers and a server through a network, the method comprising:

a reception step of receiving an input of selecting a printer among a list of printers acquired from the server, when the information processing terminal is unable to access the printer, the list of printers including an equipment name and status information of each of the printers;

a request step for requesting the server to acquire information regarding the selected printer and information displayed on a screen of the selected printer;

an acquisition step for acquiring the information regarding the selected printer and the information displayed on the screen of the selected printer from the server based on a request made in the request step; and a display control step for controlling a display of the information processing terminal to display operation status information of the selected printer, time information of replacement for consumable parts being used in the selected printer, and information displayed on the screen of the selected printer, based on the information acquired by the acquisition step, wherein the display control step includes:
controlling the display to display an image of a plurality of hard buttons of the selected printer and emulate a layout of the plurality of hard buttons such that a user operates the selected printer by selecting a button in the image of the plurality of hard buttons, controlling the server such that, in response to the user selecting the button among the plurality of hard buttons in the image, the selected printer updates status to generate and transmit a screen image to the server, and controlling the display of the information processing terminal to display the screen image of the selected printer.

12. The non-transitory computer-readable recording medium according to claim 11, the method further comprising an operation request step for requesting the server to operate a specific operation target among a plurality of operation targets of the printer, wherein the acquisition step acquires second information from the server, the second information being updated from the information regarding the selected printer and the information displayed on the screen of the selected printer, based on an operation request made in the operation request step, and wherein the display control step controls the display of the information processing terminal to display the second information acquired by the acquisition step.

13. The non-transitory computer-readable recording medium according to claim 11, wherein the display control step further includes controlling the display to:

in response to a user selecting a first button in the image of the plurality of hard buttons, display an image of a printer operation corresponding to the first button.

14. A non-transitory computer-readable recording medium that includes a program for enabling a computer to perform a method in an information processing terminal capable of communicating with a server, the method comprising:

a request step for requesting a server to acquire first information that have been displayed on a display screen of a printer capable of communicating with the server;

an acquisition step for acquiring the first information from the server based on a request made in the request step;

a display control step for controlling a display of the information processing terminal to display the first information acquired by the acquisition step; and a display style change request step for requesting the server to display a plurality of operation targets of the printer on a display of a user terminal device capable of communicating with the server, such that a display style of a selected operation target is different from that of the other operation target(s) among the plurality of operation targets, wherein the acquisition step acquires third information from the server, the third information being updated from the first information based on an operation with respect to the selected operation target that has been displayed on the display of the user terminal device, and wherein the display control step controls the display of the information processing terminal to display the third information acquired by the acquisition step.

* * * * *